United States Patent
Papadopulos

[11] 3,880,544
[45] Apr. 29, 1975

[54] MACHINE TOOL FOR MACHINING A CIRCULAR SURFACE OF A WORK PIECE

[76] Inventor: Stephan C. Papadopulos, 114 38th St., Union City, N.J. 07087

[22] Filed: Apr. 16, 1973

[21] Appl. No.: 351,651

[52] U.S. Cl. .............. 408/111; 408/158; 408/709
[51] Int. Cl. ........................................... B23b 49/00
[58] Field of Search .......... 408/709, 158, 153, 147, 408/111, 80

[56] References Cited
UNITED STATES PATENTS

| | | | |
|---|---|---|---|
| 1,028,600 | 6/1912 | Pedrick | 408/709 X |
| 1,082,283 | 12/1913 | Oster et al. | 408/158 |
| 1,295,052 | 2/1919 | Nelson | 408/111 |
| 2,040,273 | 5/1936 | Rottler | 408/111 |
| 2,711,887 | 6/1955 | Robbins et al. | 408/147 X |
| 3,421,492 | 1/1969 | Brown | 408/80 X |

Primary Examiner—Andrew R. Juhasz
Assistant Examiner—Z. R. Bilinsky
Attorney, Agent, or Firm—Robert E. Burns; Emmanuel J. Lobato; Bruce L. Adams

[57] ABSTRACT

A machine tool for machining a circular surface of the work piece, for example to refinish a bearing, comprises a first sleeve which is internally threaded and means for supporting the sleeve in axial alignment with the circular surface of the work piece that is to be machined. An externally threaded second sleeve is screwed into the first sleeve and rotatably supports a shaft the inner end of which carries a tool and the outer end of which is provided with means for rotating the shaft by power. The tool is movable or adjustable radially of the shaft and the tool together with the shaft is movable in a direction axially of the shaft by screwing the second sleeve into or out of the first sleeve. In one embodiment, the tool is mounted in a tool holder which is guided for movement radially of the shaft and is connected by linkage with a control rod which extends through the hollow shaft and has external threads engaging internal threads in the shaft. Rotation of the control rod results in screwing it in or out of the shaft and the connecting linkage converts axial movement of the control rod into radial movement of the tool-holder so that the tool can be moved radially while the shaft is rotating. There is further disclosed means for re-machining the axial bore of a multi-stage pump or a turbine casing by means of a tool carried by a shaft rotatably supported by bearings at opposite ends of the casing.

11 Claims, 14 Drawing Figures

MACHINE TOOL FOR MACHINING A CIRCULAR SURFACE OF A WORK PIECE

FIELD OF INVENTION

The present invention relates to machine tools and particularly to a portable machine tool for re-machining a circular surface of a work piece such as a bearing or valve or a pump or turbine casing.

BACKGROUND OF INVENTION

Heretofore there has been no convenient and inexpensive way of re-machining or re-dressing circular surfaces of heavy equipment such as large bearings used in ships, turbines and other installations, valve seats of large valves and the axial bores of turbine and pump casings. In installations of this kind it is usually very difficult, time consuming and costly to remove the parts requiring refinishing, transporting them to a factory or other location where there are stationary machine tools largge enough to handle the job and reinstalling the parts after refinishing. On the other hand it has been found very difficult to refinish the parts in situ with the required precision by means of portable of hand-held tools.

SUMMARY OF INVENTION

It is an object of the present invention to overcome the aforementioned difficulties by providing a machine tool which is portable so that it can be brought to the parts that are to be machined so that it is not necessary to remove the parts from the installation. Means is provided for mounting the machine tool in precise, spacial relation to the part to be machined and for operating the machine tool in a manner to effect precise machining in a convenient and rapid manner.

In accordance with the present invention, a cutting tool is mounted on a rotatable shaft and means is provided for totatably supporting the shaft in axial alignment with a circular surface of a work piece that is to be machined. Means is provided for feeding the tool in a direction axial of the shaft and also for moving or adjusting it in a direction radial of the shaft. Upon rotation of the shaft by suitable power means, the tool is moved in an orbit about the axis of the shaft so as to machine a circular surface of the work piece as desired.

The tool itself may be a tool bit made, for example of tool steel or carbide or it may be a diamond knife or a power driven rotating grinding wheel. The term tool is accordingly herein used in a generic sense to designate any suitable cutting instrumentality

BRIEF DESCRIPTION OF DRAWINGS

The nature and advantages of the invention will be more fully understood from the following description of preferred embodiments of the invention shown by way of example in the accompanying drawings in which.

DESCRIPTION OF PREFERRED EMBODIMENTS

In FIGS. 1 to 4 there is shown by way of example a machine tool in accordance with the present invention for machining or refinishing an inner cylindrical surface W1 of a work piece W having at one end an outwardly projecting flange W2 provided with a plurality of circumferentially spaced holes. The work piece W may, for example, be a bearing of a ship or of a large turbine and need not be removed from its installation for refinishing of the surface W1 by the machine tool in accordance with the present invention.

The machine tool is shown in FIGS. 1 to 4 as comprising an internally threaded outer sleeve provided with means for mounting it in fixed relation to the work piece with the longitudinal axis of the sleeve in alignment with the axis of the surface that is to be machined. An externally threaded inner sleeve is screwed into the outer sleeve and can hence be moved axially by rotating it in one direction or the other. A hollow shaft extends through the inner sleeve and is rotatably supported by it but is confined in an axial direction so that the shaft is rotatable but not longitudinally movable relative to the inner sleeve. The shaft is rotatable by power means applied to the outer end of the shaft. On the inner end there is mounted a cutting head carrying a suitable tool. Means is provided for moving the tool toward and away from the axis of the shaft, it being also movable axially of the shaft by rotating the inner sleeve so as to screw it farther into or out of the outer sleeve and thereby move the inner sleeve, shaft and tool in an axial direction.

The internally threaded out sleeve 1 is secured by set screws 2 in a cylindrical projection 3a of a mounting plate 3 which is mounted on the work piece W by means of bolts 4 extending through aligned holes in the mounting plate and in the flange W2 of the work piece and surrounded by spacing tubes 5 which extend between the mounting plate 3 and the flange of the work piece. The mounting plate 3 is thereby rigidly supported on the work piece in spaced parallel relation to the flange W2 and supports the outer sleeve 1 in axial alignment with the surface W1 of the work piece that is to be machined.

Figure 1:
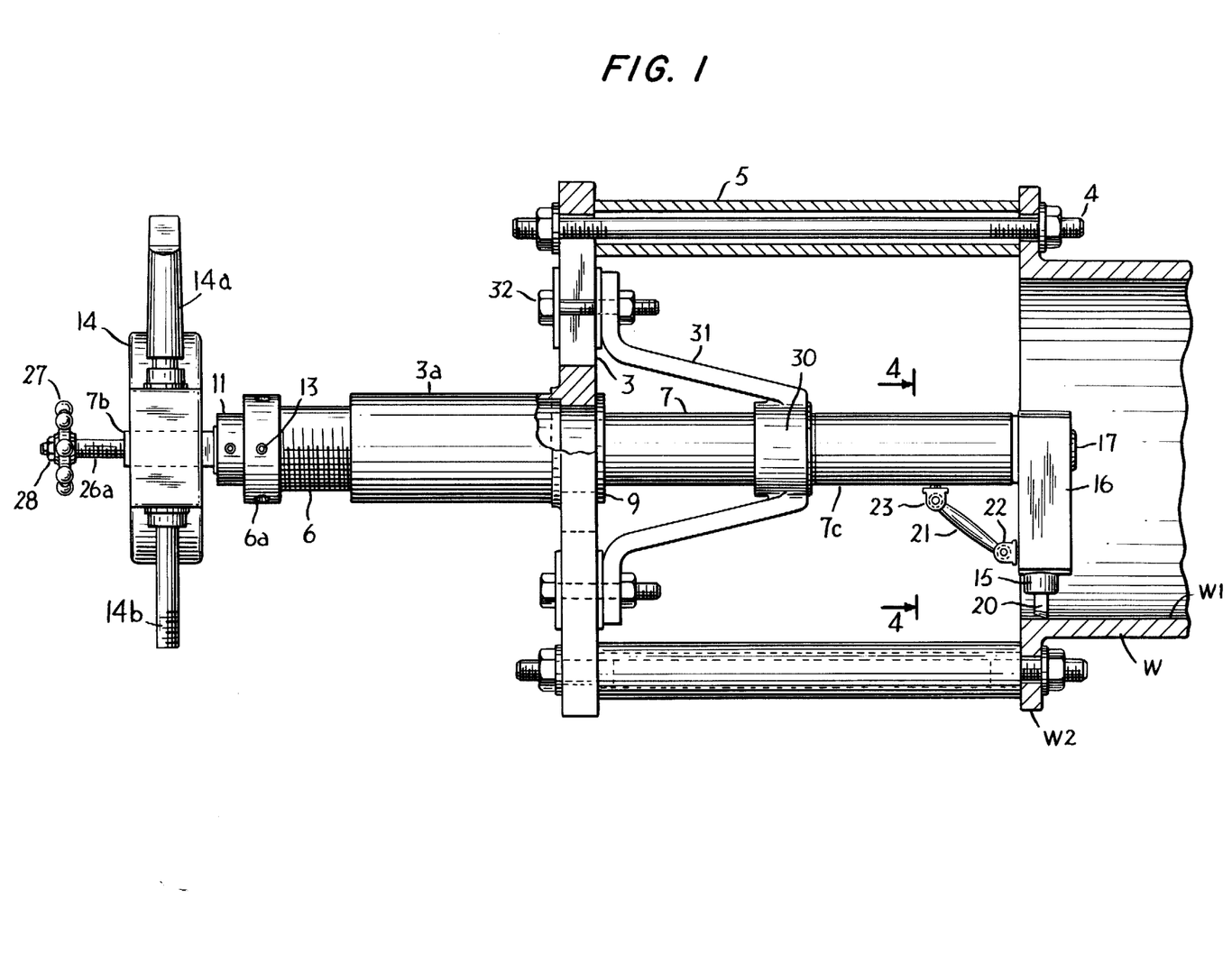
FIG. 1 is a side view partially in section showing a machine tool in accordance with the present invention mounted on a work piece having an inner cylindrical surface to be machined.
Figure 2:
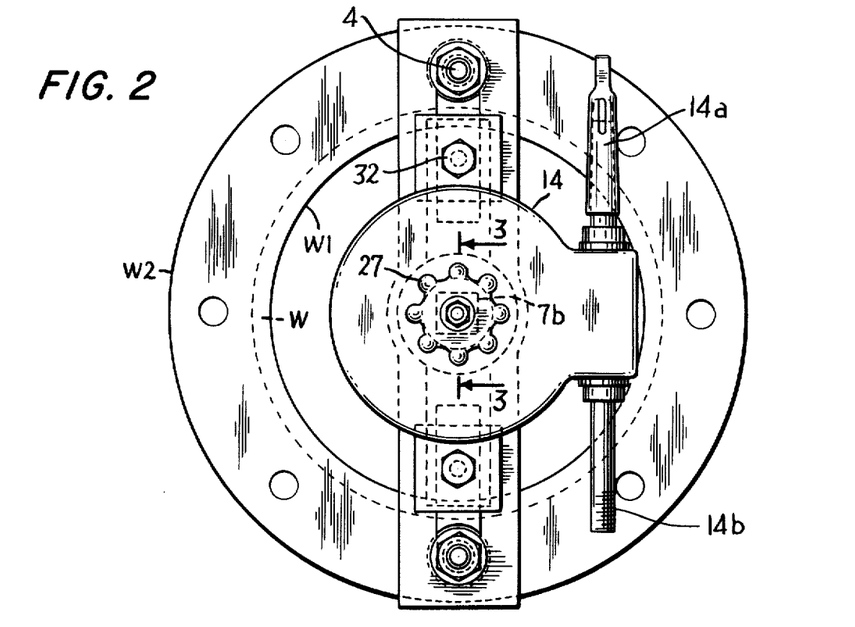
FIG. 2 is an end view of the machine tool looking at the left hand end in FIG. 1.
Figure 3A:
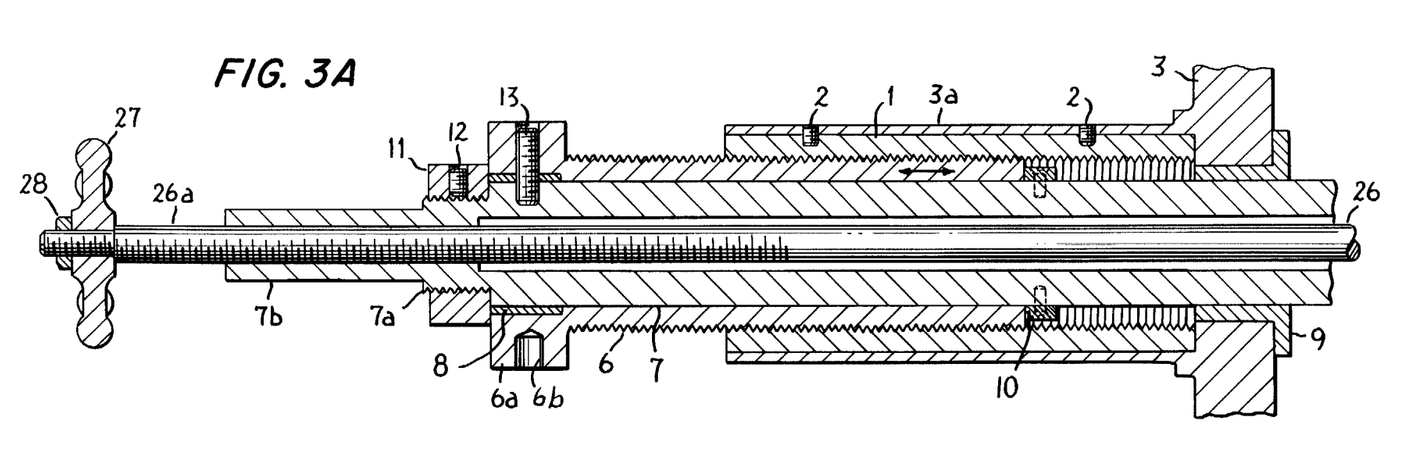
FIGS. 3A and 3B are together a partial longitudinal section of the machine tool taken approximately on the line 3—3 in FIG. 2, FIG. 3A showing a left hand portion and FIG. 3B showing a right hand portion of the machine tool as seen in FIG. 1.
Figure 3B:
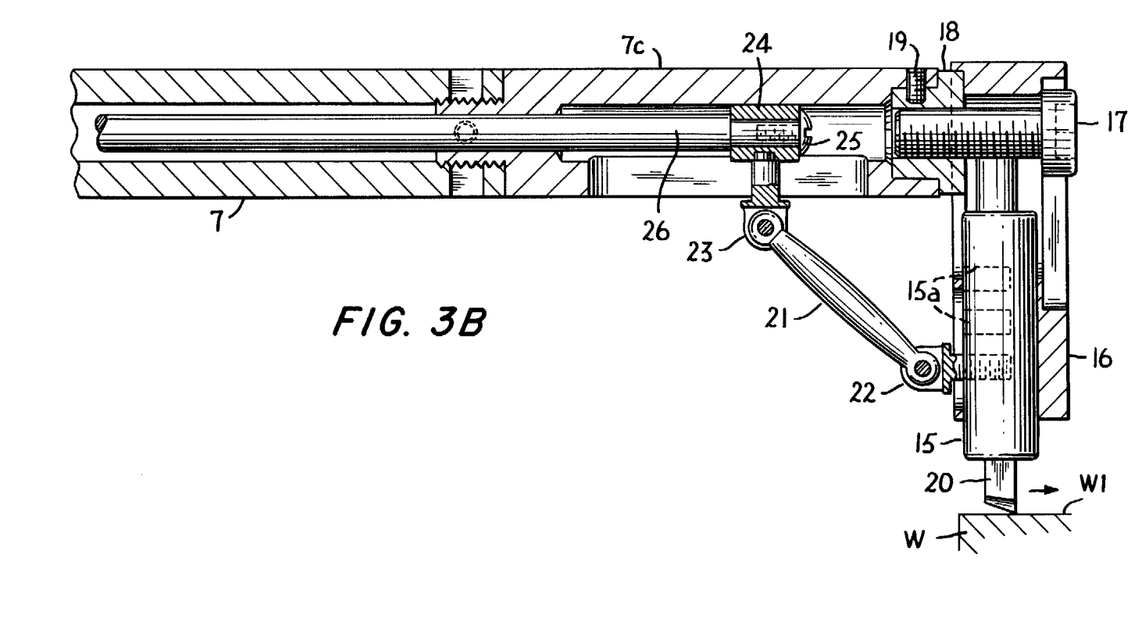
Figure 4:
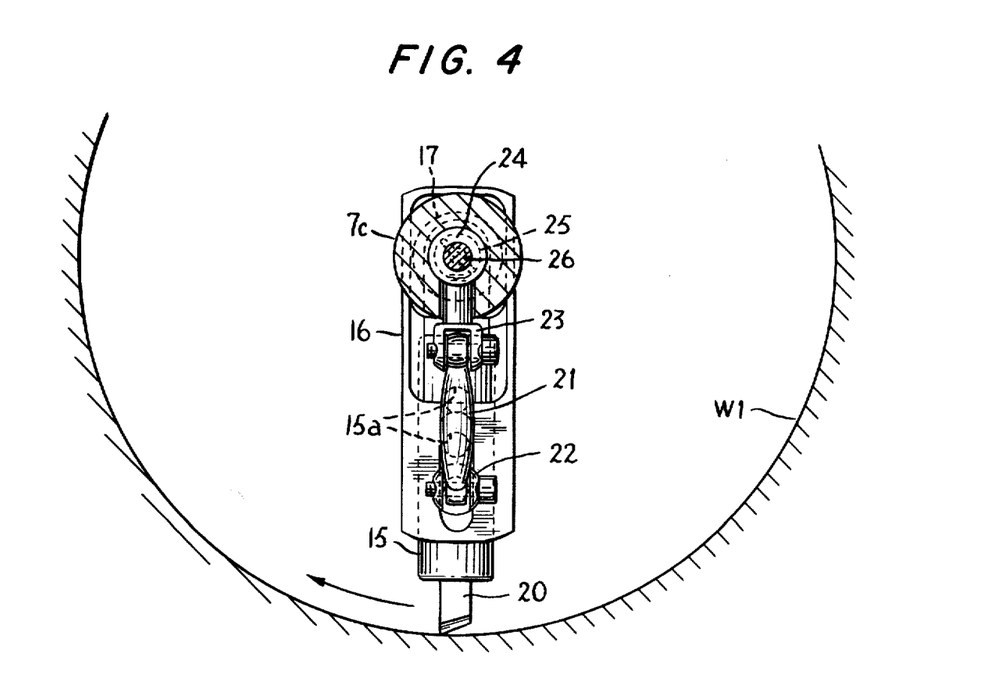
FIG. 4 is a partial sectional view taken approximately on the line 4—4 in FIG. 1.

The externally threaded inner sleeve 6 is screwed part way into the outer sleeve 1 and at its outer end portion is provided with an enlargement 6a by means of which the inner sleeve can conveniently be turned so as to screw it farther into or partly out of the outer sleeve. An elongated hollow shaft 7 extends through the inner sleeve 6 and projects at both ends of the inner sleeve. The shaft 7 is rotatably supported by a bearing 8 at the outer end of the inner sleeve 6 and a bearing 9 set in a central hole of the mounting plate 3. The shaft is thus rotatable inside the inner sleeve 6. However, it is retained in an axial direction relative to the inner sleeve by a ring or collar 10 which is set in an annular groove in the shaft 7 and is engageable with the inner end of the inner sleeve 6, and an internally threaded collar 11 which is screwed onto a reduced threaded outer end portion 7a of the shaft and is engageable with the outer end face of the inner sleeve 6. The collar 11 is secured by a set screw 12. Thus, the shaft 7 can be moved in an axial direction by rotating the inner sleeve 6 so as to screw it inwardly or outwardly of the outer sleeve 1.

While as described above, the shaft 7 is mounted for rotation in the inner sleeve 6, provision is made for selectively locking the inner sleeve to the shaft so as to rotate therewith and thereby move the shaft axially as it is rotated, the rate of axial movement being dependent on the pitch of the interengaging threads of the inner and outer sleeves. Such provision is shown as comprising a set screw 13 which is screwed into a threaded radial hole in the enlarged end portion 6a of the inner sleeve 6 and extending into an aligned radial hole in the shaft 7. Thus, when the set screw 13 is screwed in, as shown in FIG. 3A, the inner sleeve 6 and shaft 7 are locked together so that the shaft 7 is moved axially as it is rotated. When the set screw is screwed out far enough so that it does not engage the shaft 7, the shaft is freely rotatable in the inner sleeve and can be moved axially by manually rotating the inner sleeve 6 by means of the enlarged portion 6a. For this purpose the enlarged portion 6a may be knurled or may be provided with one or more holes 6b for insertion of a rod or other instrument for rotation of the sleeve 6. The rate of axial movement can be changed as desired by replacing the outer sleeve 1 and the inner sleeve 6 by similar sleeves having threads of a different pitch. It will be seen that the sleeves are readily removable to facilitate such replacement.

Means is provided for rotating the shaft 7 by power. For this purpose a projecting outer end portion 7b of the shaft 7 is of square or other non-circular shape to receive a driving unit or power head 14 comprising a worm gear which is rotatably mounted in a suitable casing and fits onto the end 7b of the shaft. The worm gear is driven by a worm rotatably mounted in the casing in engagement with the worm gear and provided with oppositely extending shafts partions 14a and 14b by either of which the worm and hence the worm gear and the shaft 7 can be driven. The projecting shaft portion 14a of the worm is adapted to couple to a pneumatic motor or air machine for driving the worm. The projecting shaft portion 14b of the worm is adapted to be connected to a drill machine. Such power equipment is ordinarily available at locations where the machine tool is to be used. However, other appropriate driving means can be provided as desired.

A cutting head provided at the inner end of the shaft 7 comprises a tool holder 15 slidably mounted in a guide member 16 secured onto the end of an extension 7c on the inner end of the shaft by a stud bolt 17 screwed into a bushing 18 which in turn fits into the end of the shaft extension and is secured by a set screw 19. The shaft extension 7c has at the opposite end an externally threaded portion of reduced diameter which screws into an internally threaded bore at the end of the shaft 7. Different lengths of different numbers of extensions can be used to obtain the total length of shaft desired for the particular work piece being machined. The guide member 16 thus rotates with the shaft 7. The tool holder 15 carries at its outer end a cutting tool 20 and is guided by the guide 16 for movement toward and away from the axis of the shaft. The position of the tool is controlled by means of a link 21, one end of which is pivotally connected with the tool holder 15 by means of a pivot stud 22 while the other end is connected by a pivot stud 23 with a cylindrical bushing 24 which is rotatably secured by a screw 25 on the end of a control rod 26 that extends through the hollow shaft 7. The pivot stud 22 extends through a longitudinal slot in the guide 16 and the pivot stud 23 extends through a longitudinal slot in the shaft extension 7c. A portion 26a of the control rod is provided with external threads mating with internal threads in the extension 7b of the shaft 7. The control rod 26 is rotatable by means of a hand wheel 27 secured on a reduced threaded outer end portion of the control rod by a nut 28. By reason of the threaded portion 26a, rotation of the rod by means of the hand wheel 27 results in axial movement of the control rod which is transmitted and converted by the link 21 into movement of the tool holder 15 in a direction radial of the shaft. It will be understood that the bushing 24 does not rotate with the control rod but transmits its axial movement to the link 21. The radial position of the tool 20 is thus controllable by means of the hand wheel 27 to bring the tool into engagement with the work piece and to control the depth of cut. Feeding movement of the tool 20 in a direction parallel to the axis of the shaft to machine the inner surface W1 of the work piece W is effected by rotation of the inner sleeve 6 either manually or by locking the inner sleeve to the rotating shaft 7 by means of the set screw 13. The power feed of the tool can, of course, be used if desired to cut a thread on the work piece. Such thread would have the same pitch as the threads of the inner and outer sleeves which, as described above, are interchangeable and are selected to provide the pitch desired. The range of movement of the tool holder 15 in a direction radial of the shaft is selected by mounting the pivot stud 22 in one or another of threaded holes 15a provided in the tool holder.

In order to provide further support for the rotating shaft 7, an outrigger bearing 30 may be provided between the support plate 3 and the work piece as illustrated in FIG. 1. The bearing 30 is supported by braces 31 secured to the support plate 3 by bolts 32.

The use of the machine tool shown in FIGS. 1 to 4 will be readily understood from the foregoing description. When it is desired to machine dress or refinish a circular surface of a work piece, the machine tool is mounted on the work piece as illustrated by way of example in FIG. 1. A suitable tool 20 is provided in the tool holder 15 and is brought into proper position to begin a cut by turning the inner sleeve 6 manually to move the tool in an axial direction and by turning the hand wheel 27 to move it radially. For example, the tool would be set at the left hand end of the work piece illustrated in FIG. 1 in such radial position as to make a cut of the desired depth. The shaft 7 is thereupon rotated by means of the power head 14 and the tool is fed axially by rotation of the inner sleeve 7 either by hand or by locking it to the shaft 7 by means of the set screw 13 as described above. When one cut has been completed on the surfaces to be machined, the tool can be moved out further by means of the hand wheel 27 so as to make another cut in like manner. If a radial face of the work piece is to be machined, the tool holder 15 is provided to hold a tool in position to engage a radial face. The depth of cut is then controlled by means of the inner sleeve 6 while feeding movement of the tool is effected by means of the hand wheel 27. It will be understood that since the shaft is ordinarily rotated at a low speed, the control rod 26 can be rotated relative to the shaft by the hand wheel 27 even while the shaft is turning.

Figures 5, 5A, 6:
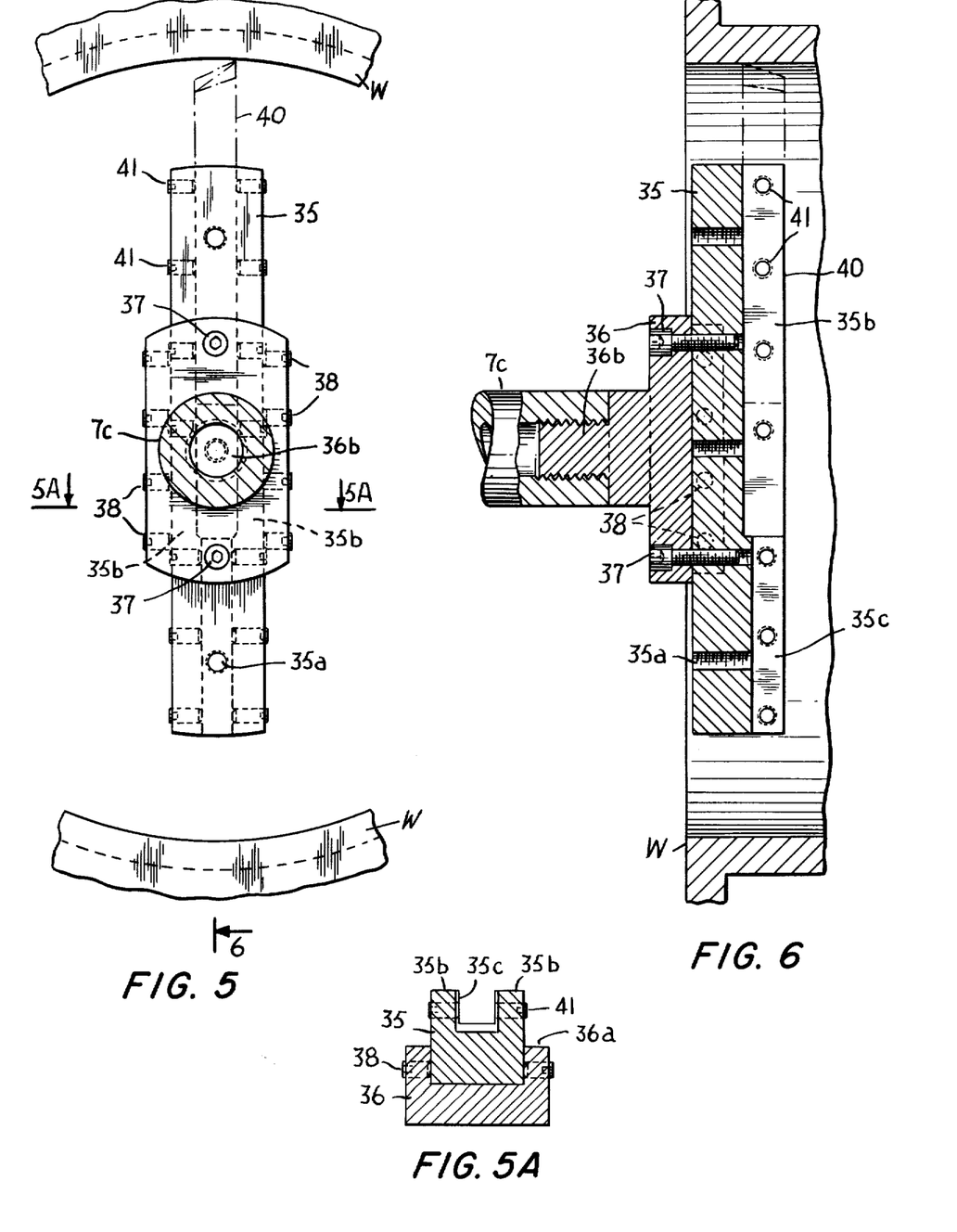
FIG. 5 is a partial sectional view similar to FIG. 4 but showing a different mounting of the cutting tool.
FIG. 5A is a cross section taken on the line 5A—5A in FIG. 5.
FIG. 6 is a sectional view taken approximately on the line 6—6 in FIG. 5.

In FIGS. 5 to 6 there is shown a cutting head different from that illustrated in FIGS. 1 to 4. An elongated tool holder 35 is received between opposite flanges 36a of a mounting and guide member 36 having a threaded shank portion 36b which is screwed into the internally threaded end of an extension 7c of the shaft 7 (FIG. 1) so as to rotate with the shaft. The tool holder 35 is secured to the guide member 36 by two stud bolts 37 which extend through holes in the member 36 and screw into two of a plurality of tapped holes 35a provided in the tool holder 35. The holes are arranged to permit mounting the tool holder in different positions with respect to the member 36. The tool holder is further secured to the member 36 by a plurality of set screws 38 screwed into tapped holes extending through the flanges 36a and engaging opposite sides of the tool holder.

The tool holder 35 has opposite flanges 35b defining between them a longitudinally extending channel 35c to receive a tool 40 which may be of round, square or other cross sectional shape as desired. The tool is held in adjusted position in the channel by a plurality of set screws 41 which extend through tapped holes provided at spaced intervals in the flanges 35 and engage opposite sides of the tool 40. The tool can thus be adjusted in a radial direction in the channel 35c and held in adjusted position by the set screws 41. As seen in FIGS. 5 and 6 lower portions of the channel 35c are made smaller to receive a tool of smaller cross section. For example, the upper portion of the channel 35c may be designed to accommodate a ½ inch tool and the lower part a ⅜ths inch tool.

A machine tool using the cutting head shown in FIGS. 5 to 6 is operated in the same manner as described with reference to FIGS. 1 to 4 except that adjustment of the tool in a direction radial of the shaft is effected by selecting the position of the tool holder 35 with respect to the mounting and guiding head 36 and by adjustably positioning the tool 40 in the channel of the tool holder.

Figures 7, 8:
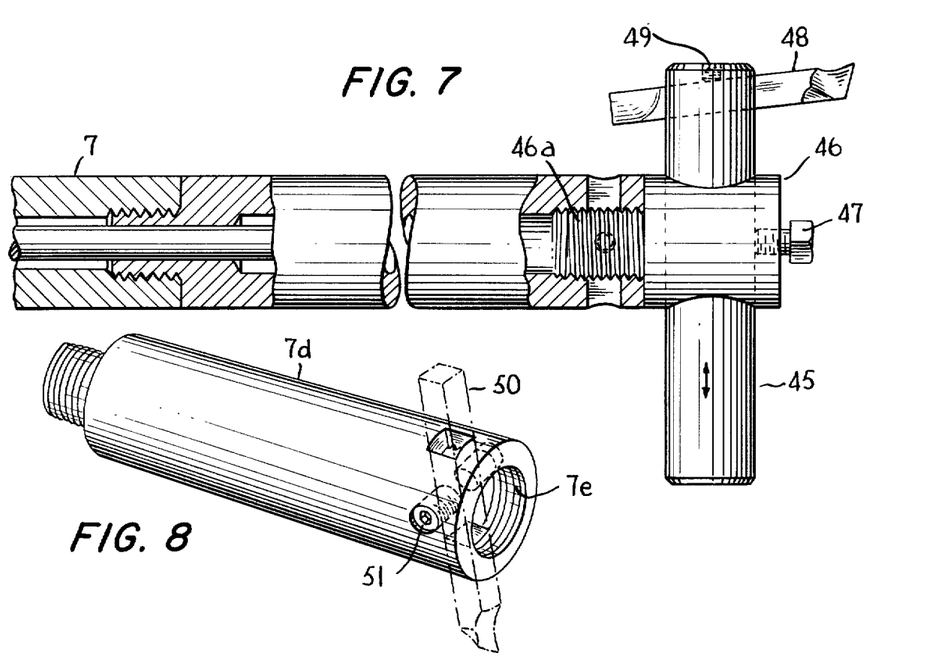
FIG. 7 is a side view partially in section of a portion of the machine tool showing another mounting of the cutting tool.
FIG. 8 is a perspective view showing still another mounting of the cutting tool.

Still another embodiment of the cutting head is illustrated in FIG. 7. A cylindrical tool holder 45 is adjustably slidable in a transverse cylindrical bore of a guiding and mounting member 46 having a threaded shank portion 56a which is screwed into a tapped hole in the end of an extension 7c of the rotating shaft 7 of the machine tool. The mounting member 46 and tool holder 45 thus rotates with the shaft. The tool holder 45 is adjustable in a direction radial of the shaft by sliding it in the bore of the mounting and guiding member 46 and is secured in adjusted position by a set screw 47 screwed into a tapped hold in the end of the member 46 and engaging the tool holder. A tool 48 is received in a transverse but slightly inclined hole near the end of the tool holder 45 and is secured in adjusted position by a set screw 49 screwed through a tapped hole in the end of the tool holder. The tool 48 is thus adjustable in an approximately axial direction with reference to the tool holder and is adjustable in a radial direction by moving the tool holder with respect to the mounting member 46. Moreover the tool holder 45 is rotatable in the bore of the mounting member 46 to adjust the angular position of the tool. The entire shaft 7 together with the tool holder and tool are movable in a direction axial of the shaft by rotation of the inner sleeve 6 as described above with reference to FIGS. 1 to 4.

In FIG. 8 there is shown a cutting head particularly useful in machining small diameter work. A tool 50 is received in a transversely extending but slightly inclined hole near the end of an extension 7d of the shaft 7 which thus serves as a tool holder. The tool 50 is slidable in an endwise direction to adjust its position radially of the shaft and is secured in adjusted position by set screws 51 screwed into diametrically opposite tapped holes in the member 7d. The extension 7d is provided at its inner end with a threaded bore 7e so that (when the tool 50 is not used) it can receive a mounting member like the member 46 shown in FIG. 7 or can receive another extension of the shaft. Any number of extensions like the extension 7d with or without a transverse hole to receive a cutting tool may be screwed onto the shaft 7 in order to provide a total length appropriate for the work to be machined.

With the embodiment shown in FIG. 8 the tool 50 is adjusted in a radial direction by sliding it in the transverse hold in the member 7d and is movable in an axial direction by rotation of the inner sleeve 6 as described with reference to FIGS. 1 to 4.

Figure 9:
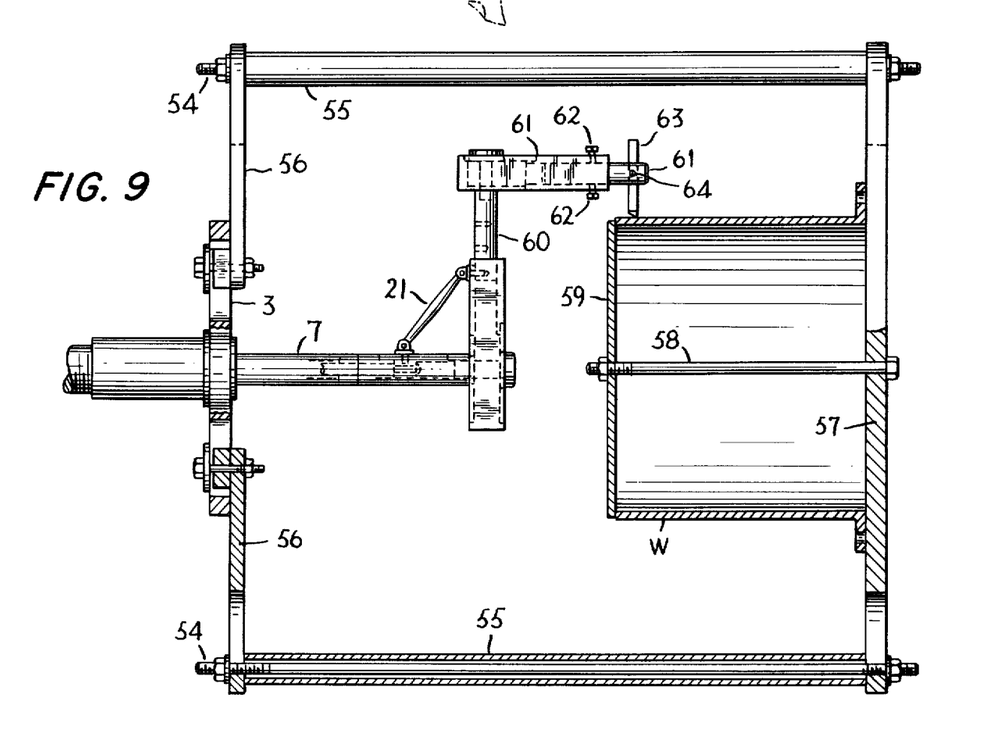
FIG. 9 is a side view partially in section showing a portion of a machine tool similar to that of FIG. 1 but arranged to machine an outside cylindrical surface.

In FIG. 9 there are illustrated a somewhat different cutting head and different mounting arrangement for machining the outside surface of a work piece. The machine tool is mounted on the work piece by means of bolts 54 and spacing tubes 55 extending between extensions 56 of the mounting plate 3 of the machine tool and a plate 57 secured to the work piece W by a long central bolt 58 which extends through aligned holes in the plate 57 and a plate 59 at the aligned opposite end of the work piece. The machine tool is thereby mounted with the shaft 7 in axial alignment with an outer surface of the work piece that is to be machined.

The cutting head is similar to that shown in FIGS. 1 to 4 except that the tool holder 60 is elongated and is provided at its outer end with an arm 61 that extends approximately parallel to the axis of the shaft 7. A tool bar 61 is adjustable slidable in an axially bore of the arm 61 and is held in adjusted position by set screws 62. A tool 63 is received in a transverse hole near the end of the tool bar 61 and extends inwardly to the work. The tool is held in adjusted position by a set screw 64.

The operation of the machine tool is illustrated in FIG. 9 is the same as that described with reference to FIGS. 1 to 4 except that the tool is arranged to engage and machine an outer, rather than an inner, surface of the work piece. The tool is adjustable in a radial direction by adjustment relative to the tool bar 61 and by adjustment by means of the hand wheel 27 acting through the control rod 26 and link 21 as described above. Feeding movement of the tool in a direction axial of the work is effected by rotation of the inner sleeve 6 as previously described.

Figures 10, 11, 12:
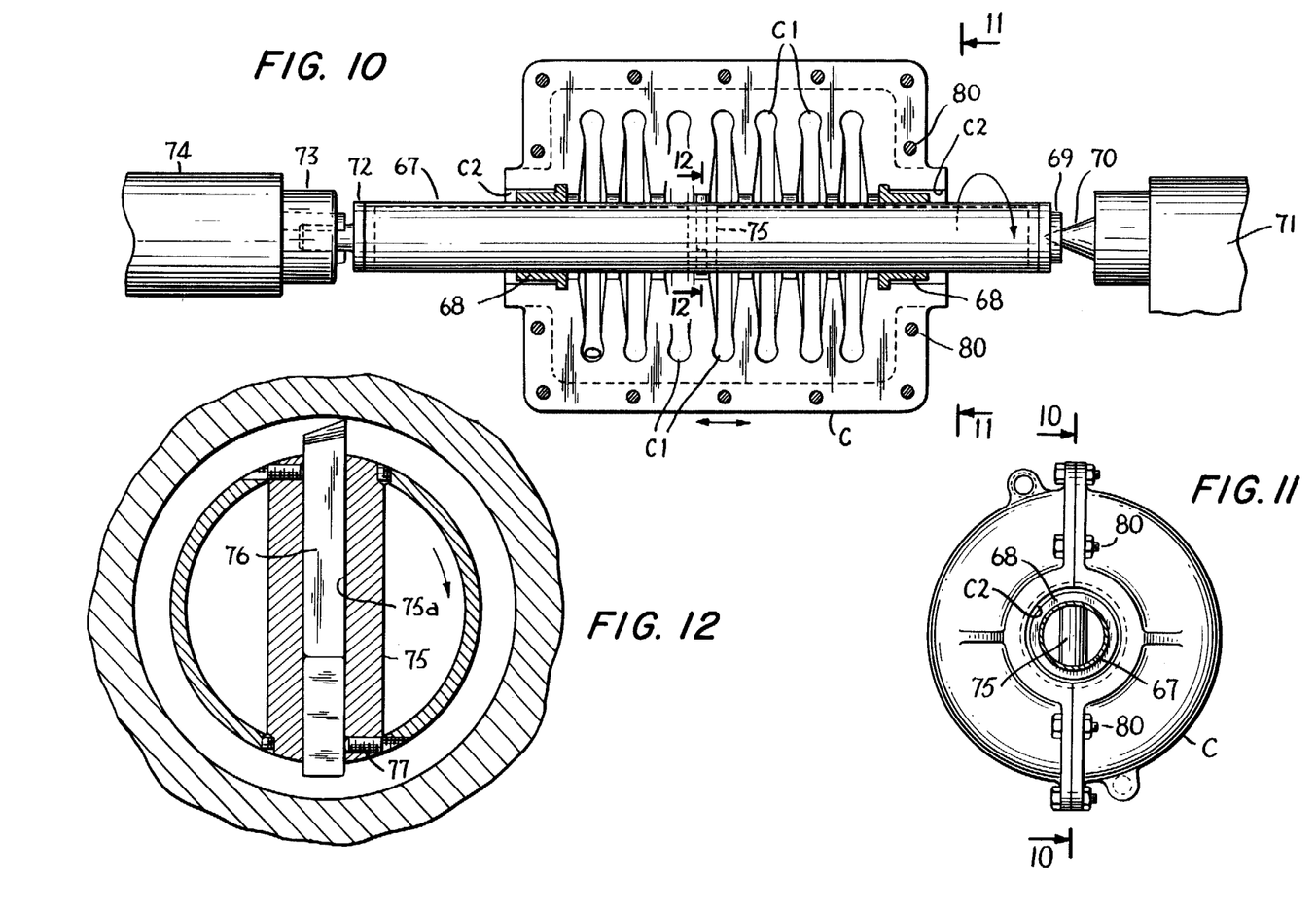
FIG. 10 is a side view partially in section of a machine tool for refinishing the axial bore of a turbine or pump casing.
FIG. 11 is an end view partially in section taken approximately on the line 11—11 in FIG. 10.
FIG. 12 is an enlarged cross section taken approximately on the line 12—12 in FIG. 10.

In FIGS. 10 to 12 there is shown a machine tool for machining the inner bore of a work piece comprising the split casing C of a multistage pump turbine. The casing has a cylindrical bore extending through a plurality of chambers C1 for successive stages of the pump or turbine. At opposite ends there are cylindrical bearing seats C2. The machine tool comprises a hollow shaft 67 which extends axially through the casing and projects at both ends. The shaft 67 is rotatable in bearings 68 into the bearing seats C2 at opposite ends of the casing. It is thereby maintained in precise axial alignment with the casing bore. A plug 69 fixedly inserted in one end of the hollow shaft 67 is provided with a central conical recess to receive the pivot 70 of the tail stock 71 of a lathe. A plug 72 fixedly inserted in the opposite end of the hollow shaft 67 is provided with an axially projecting stub shaft adapted to be received in the chuck 73 of the head stock 74 of a lathe. The shaft 67 is thereby power driven by the lathe.

At a point intermediate its length, the shaft 67 is provided with a tool holder in a form of a member 65 which is secured in the shaft, for example by welding and has a channel 75a, for example of square cross section, extending diametrically of the shaft. A tool 76 is slidably received in the channel 75a and is secured in adjusted position by Allen headed set screw 77 screwed into tapped holes extending chord-wise of the shaft.

After the tool 76 has been adjusted to the desired radial position to take a cut of the desired depth, the shaft 67 is rotated by means of the latche head stock 74 and the casing C is moved axially of the shaft to dress successively the cylindrical surfaces between the chambers C1. The casing can be thus machined when the two halves of the split casing are assembled or if desired, each half can be machined individually. In order to renew the inter-stage surfaces of the casing, worn or corroded metal may first be machined away, fresh metal then welded onto the surfaces and the metal thus deposited may then be machined to the desired internal diameter. In FIG. 11 the two halves of the split casing is shown held in assembled relation by a plurality of bolts 80.

A tool of the kind shown in FIGS. 3A and 3B can also be used in machining a work piece of the kind illustrated in FIGS. 10 to 12. In this event the tool is made of appropriate size to be received in the bore of the work piece which may, for example, be of the order of 6 inches. The tool may be held centered with respect to the work piece by one or more bushings such as bushings 68 shown in FIG. 10. The use of a tool of the kind shown in FIGS. 3A and 3B permits adjustment of the radial position of the tool while rotating.

While preferred embodiments of the invention have been illustrated by way of example in the drawings and are herein particularly described it will be understood that many modifications other than those illustrated may be made. For example a tool of the kind shown in FIG. 1 may be extended as desired by adding one or more extension sections of the shaft 7 and the shaft may be provided with one or more bearings such as the bearing 30 to prevent wobble. In the embodiment illustrated in FIG. 10 the shaft 67 may be supported by a steady rest instead of the tail stock 71. It will thus be recognized that the invention is in no way limited to details of the described embodiments.

I claim:

1. A machine tool for machining a circular surface of a work piece, comprising an internally threaded first sleeve, means for supporting said first sleeve in axial alignment with said circular surface of the work piece, an externally threaded second sleeve coaxial in said first sleeve and having threads engaging the threads of said first sleeve, said second sleeve being rotatable in said first sleeve and thereby movable axially of said first sleeve, a hollow shaft extending through said second sleeve, bearing means supporting said shaft in said second sleeve for rotating in said second sleeve and axial movement with said second sleeve, said shaft having first and second end portions projecting from opposite ends of said second sleeve, a tool holder, means for mounting said tool holder on said first end portion of said shaft, said mounting means comprising guide means in which said tool holder is slidable toward and away from the axis of said shaft, a tool held by said tool holder and engageable with said surface, means operably connected with said second end portion of said shaft for rotating said shaft, means for adjustably positioning said tool radially inwardly and outwardly relative to said shaft, said shaft having an internally threaded portion and said tool positioning means comprising a control rod extending axially of said shaft and having external threads engaging said internally threaded portion of said shaft, said control rod extending beyond said second end portion of said shaft and being provided with means for rotating said control rod relative to said shaft and thereby moving said control rod axially of said shaft, and means connecting an inner portion of said control rod with said tool holder to convert axial movement of said control rod to radial movement of said tool holder along said guide means, and means for rotating said second sleeve relative to said first sleeve to move said shaft with said tool holder and tool axially of said shaft relative to the work piece.

2. A machine tool according to claim 1, in which said connecting means comprises a link pivotally connected at one end with said control rod and pivotally connected at the opposite end with said tool holder.

3. A machine tool according to claim 2, comprising means for pivotally connecting said link to said tool holder selectively at different points along said tool holder to provide for different ranges of movment of said tool holder by axial movement of said control rod.

4. A machine tool according to claim 1, in which a bushing is rotatable on said inner portion of said shaft and said connecting means comprises a link pivotally connected at one end to said bushing and at the opposite end to said tool holder.

5. A machine tool according to claim 1, in which said means for supporting said first sleeve comprises a plate having an opening, means for supporting said plate in fixed position relative to said work piece with said opening in axial alignment with said circular surface and means securing said first sleeve on said plate in alignment with said opening.

6. A machine tool according to claim 5, in which said plate is supported in spaced relation to said work piece and in which bearing means supported by said plate and disposed between said plate and the work piece rotatably supports said shaft.

7. A machine tool according to claim 1, comprising means for releasably securing said second sleeve to said shaft to rotate with said shaft and thereby move said shaft axially relative to said first sleeve as said shaft rotates.

8. A machine tool according to claim 1, in which said means for rotating said shaft comprises a worm gear on said second end portion of said shaft, a worm engaging said worm gear and means for rotating said worm.

9. A machine tool according to claim 1, in which said shaft comprises a main part and at least one axial extension removably secured to said main part whereby the total length of said shaft can be varied by securing to said main part one or more said axial extensions.

10. A machine tool according to claim 1 for machining an external surface of said work piece, said tool holder comprising a first member slidable on said guide means and a second member extending from said first member in a direction generally axial of said shaft and having means for holding a tool with a bit end extending inwardly toward the extended axis of said shaft.

11. A machine tool for machining an external surface of a work piece, comprising an internally threaded first sleeve, means for supporting said first sleeve in axial alignment with said circular surface of the work piece, an externally threaded second sleeve coaxial in said first sleeve and having threads engaging the threads of said first sleeve, said second sleeve being rotatable in said first sleeve and thereby movable axially of said first sleeve, a shaft extending through said second sleeve, bearing means supporting said shaft in said second sleeve for rotating in said second sleeve and axial movement with said second sleeve, said shaft having first and second end portions projecting from opposite ends of said second sleeve, a tool holder on said first end portion of said shaft, a tool held by said tool holder and engageable with said surface, means operably connected with said second end portion of said shaft for rotating said shaft, means for adjustably positioning said tool radially inwardly and outwardly relative to said shaft, and means for rotating said second sleeve relative to said first sleeve to move said shaft with said tool holder and tool axially of said shaft relative to the work piece, said tool holder comprising a first member carried by said first end portion of said shaft for adjustment radially of the shaft and a second member extending from said first member in a direction generally axial of said shaft and having means for holding a tool with a bit end extending inwardly toward the extended axis of said shaft.

* * * * *